Patented Jan. 14, 1941

2,228,639

UNITED STATES PATENT OFFICE 2,228,639

ELECTRIC WELDING MEDIUM

Wilber B. Miller, Niagara Falls, N. Y., assignor to The Linde Air Products Company, a corporation of Ohio No Drawing. Application February 10, 1940, Serial No. 318,367

8 Claims. (Cl. 148—26)

This invention relates to electric welding processes in which molten metal is deposited from a bare metal electrode onto a metal workpiece and coalesced with the latter, the entire welding zone including the melting end of the electrode and the molten deposited metal being covered by a deep blanket or "welding medium" of partially molten initially comminuted and unbonded silicates or the like substantially free from gas-evolving substances. Such a process is described, for instance, in Patent 2,043,960 issued Lloyd T. Jones et al.

The quality of the weld produced in welding processes of this kind depends to a very large extent upon the composition of the welding medium. The general characteristics of satisfactory welding media are described in the above-mentioned patent, and a large number of possible media are suggested therein. Commercial practice of the process has generally adopted the metasilicate compositions specifically advocated in the patent, with but slight modifications to meet the requirements of individual cases.

It has been found that for some purposes, as in welding thin sheets, e. g. 8 to 16 gage steel sheet, or for welding chromium and chromium-nickel steels, the welding medium can, with advantage, be more extensively modified. An object of this invention is to provide a welding medium of novel composition and properties, better adapted than previously known media for use in many applications of the welding processes under discussion.

According to the present invention, welding media for the purposes described consist of comminuted fused mixtures, preferably unbonded, comprising about 34% to 42% silica, 10% to 28% alumina, remainder lime and magnesia. Preferably, the composition corresponds to that of mixtures of anorthite and monticellite. Particularly good results have been obtained with compositions corresponding to 35% to 65% anorthite, remainder monticellite. The mixtures are preferably prepared for use by fusing the ingredients, then solidifying and comminuting the material.

Monticellite is a mineral of substantially the composition: $CaO \cdot MgO \cdot SiO_2$; while anorthite is a mineral of substantially the composition: $CaO \cdot Al_2O_3 \cdot 2SiO_2$. It will be understood that herein and in the appended claims the terms anorthite and monticellite include not merely the natural minerals but also artificially prepared mixtures and compounds having analogous compositions by proximate analysis.

The ratio of lime to magnesia may be varied successfully over the entire range, say from one part lime to 99 parts magnesia up to 99 parts lime to one part magnesia. However, particularly good results have been obtained by the use of compositions containing:

|  | Broad | Preferred |
|---|---|---|
| Percent CaO | 20 to 32 | 25 to 29 |
| Percent MgO | 6 to 20 | 9 to 15 |
| Percent $Al_2O_3$ | 28 to 10 | 18 to 12 |
| Percent $SiO_2$ | 34 to 42 | 35 to 40 |

It is preferred to add to the mixture of the invention about 2% to 10% of one or more melting-point depressants of the group consisting of alkaline earth metal halides (e. g. calcium fluoride) and manganese oxide (MnO). On occasion the amount of such depressant or depressants may be increased, up to about 25%. The halides may be added after the prefusion step if desired. It will sometimes be desired to include minor proportions of other ingredients, either as incidental impurities or as intentional additions made to modify the properties of the medium. For instance, 1% to 5% iron oxide (FeO) and a minor percentage of titanium oxide ($TiO_2$) may be included. Oxides such as MnO and FeO should be chemically combined with other ingredients of the medium.

A preferred composition corresponds to about 58 parts of monticellite, about 42 parts anorthite, and about 4 to 8 parts of either calcium fluoride or manganese oxide (MnO) or both.

Such a composition has approximately the following viscosities at elevated temperatures, determined according to the method described by R. S. McCaffery et al. in vol. 100 (1932) Trans. American Institute of Mining and Metallurgical Engineers:

|  | Poises |
|---|---|
| 1390° C | 5 |
| 1248° C | 25 |
| 1173° C | 200 |

The compositions included within this invention are particularly useful as media for welding 8 to 16 gage plain carbon steel sheets, chromium steel sheets and plates containing about 4% to 6% chromium, and austenitic chromium-nickel steel sheets and plates, although they may be used to advantage in the welding of many other kinds of materials and in the welding of thicker material, for instance 4 inches or more in thickness.

A property of this new welding medium that may be used to advantage is that it causes only a slight increase, about 0.05% to 0.15%, in the silicon content of the deposited weld metal. The inclusion of at least 3% MnO in the welding medium assists in minimizing the increase in silicon content of the weld metal.

This application is in part a continuation of my application Ser. No. 249,559, filed January 6, 1939.

I claim:

1. Electric welding medium consisting principally of alkaline earth metal aluminosilicate and having substantially the composition: 34% to 42% silica, 28% to 10% alumina, remainder lime and magnesia.

2. Electric welding medium consisting principally of alkaline earth metal aluminosilicate and having substantially the composition: 20% to 32% lime, 6% to 20% magnesia, 28% to 10% alumina, and 34% to 42% silica.

3. Electric welding medium consisting of a prefused, comminuted, and unbonded material composed principally of alkaline earth metal aluminosilicate and having substantially the composition: 25% to 29% CaO, 9% to 15% MgO, 18% to 12% $Al_2O_3$, 35% to 40% $SiO_2$.

4. Prefused electric welding medium consisting principally of a material having the composition of a mixture of anorthite and monticellite in the proportions of 35% to 65% anorthite remainder monticellite.

5. Prefused electric welding medium as defined in claim 1, also containing 2% to 25% of a melting-point depressant selected from the group consisting of alkaline earth metal halides and manganese oxide and mixtures thereof.

6. Prefused electric welding medium consisting substantially of 4 parts to 8 parts calcium fluoride, 58 parts monticellite, and 42 parts anorthite.

7. Prefused electric welding medium as claimed in claim 1 and having a viscosity of 5 poises at about 1390° C., 25 poises at about 1250° C., and 200 poises at about 1175° C.

8. Electric welding medium as defined in claim 1, containing about 2% to 20% MnO chemically combined with other ingredients of said medium.

WILBER B. MILLER.